(12) United States Patent   (10) Patent No.: US 7,877,468 B2
Abadir et al.   (45) Date of Patent: Jan. 25, 2011

(54) SYSTEMS AND METHODS FOR VERTICALLY INTEGRATED DATA DISTRIBUTION AND ACCESS MANAGEMENT

(75) Inventors: Sam Abadir, Philadelphia, PA (US); Robert Gaydos, Harleysville, PA (US); Stephen Malaby, Devon, PA (US); John A. Schlack, Quakerstown, PA (US); Michael Chen, Wallingsford, PA (US); Clifford Lewis, Jamison, PA (US)

(73) Assignee: Concurrent Computer Corporation, Duluth, GA (US)

( * ) Notice: Subject to any disclaimer, the term of this patent is extended or adjusted under 35 U.S.C. 154(b) by 0 days.

(21) Appl. No.: 10/821,802

(22) Filed: Apr. 9, 2004

(65) Prior Publication Data

US 2005/0165921 A1   Jul. 28, 2005

Related U.S. Application Data

(60) Provisional application No. 60/538,626, filed on Jan. 23, 2004.

(51) Int. Cl.
*G06F 15/173* (2006.01)
*H04N 7/173* (2006.01)

(52) U.S. Cl. .......................... 709/223; 725/97
(58) Field of Classification Search ............. 725/86–87, 725/115, 96–97, 74, 82, 90–93, 100–101; 708/235; 709/217–219, 223
See application file for complete search history.

(56) References Cited

U.S. PATENT DOCUMENTS

| 5,631,694 | A | 5/1997 | Aggarwal |
| 6,378,036 | B2 * | 4/2002 | Lerman et al. ............. 711/112 |
| 6,378,129 | B1 * | 4/2002 | Zetts .............................. 725/94 |
| 6,411,946 | B1 * | 6/2002 | Chaudhuri .................... 706/21 |
| 6,510,556 | B1 * | 1/2003 | Kusaba et al. ................ 725/93 |
| 6,609,149 | B1 * | 8/2003 | Bandera et al. ............. 709/219 |
| 7,024,681 | B1 | 4/2006 | Fransman et al. |
| 2002/0199200 | A1 * | 12/2002 | Addington .................... 725/97 |
| 2003/0005452 | A1 * | 1/2003 | Rodriguez .................... 725/86 |
| 2004/0226042 | A1 * | 11/2004 | Ellis ............................... 725/43 |
| 2005/0039213 | A1 * | 2/2005 | Matarese et al. ............. 725/95 |
| 2005/0086691 | A1 * | 4/2005 | Dudkiewicz et al. ........ 725/44 |
| 2005/0097599 | A1 * | 5/2005 | Plotnick et al. ............. 725/32 |
| 2005/0137958 | A1 * | 6/2005 | Huber et al. .................. 705/37 |
| 2005/0172326 | A1 * | 8/2005 | Jerding et al. .............. 725/116 |
| 2006/0031401 | A1 * | 2/2006 | Verhaegh et al. ........... 709/218 |
| 2006/0179469 | A1 | 8/2006 | Fransman et al. |

OTHER PUBLICATIONS

EPO, "Search Report", *EPSN: 05711861.4 from PCT/US2005002098, in the name of Concurrent Computer Corporation*, Mailed Jul. 5, 2010.

\* cited by examiner

*Primary Examiner*—Joseph E Avellino
*Assistant Examiner*—Chirag Patel
(74) *Attorney, Agent, or Firm*—Philip H. Burrus, IV

(57) ABSTRACT

Scheduled data is received and distributed in a system, such as a DSDD system. A schedule director receives a schedule representing inventory of data available from a data source and desired times for distributing the data. The schedule director coordinates with one or more resource managers that maintain information regarding resource utilization in the system. The schedule director negotiates with the resource managers to reserve resources in the system for receiving the scheduled data from the data source, storing the received data, and/or preparing the received data for delivery to a user. Resources are reserved based on the schedule and the resources determined to be available. The resources are reserved to perform at least one task, independent of other resources in the system.

20 Claims, 9 Drawing Sheets

SYSTEMS AND METHODS FOR VERTICALLY INTEGRATED DATA DISTRIBUTION AND ACCESS MANAGEMENT

CROSS-REFERENCE TO RELATED APPLICATION

This application claims priority to U.S. Provisional Application No. 60/538,626 filed Jan. 23, 2004 and hereby incorporated by reference.

BACKGROUND

The present invention generally relates to systems and methods for vertically integrated distribution of data via a server complex. In particular, the invention relates to systems and methods for controlling receipt and distribution of scheduled data in one or more server complexes.

Digital systems for the storage, distribution, and display of data are commonplace and come in many forms. These systems are commonly referred to as DSDD systems. A video-on-demand (VOD) system is an example of a system that utilizes all these capabilities.

A VOD system is a system for the delivery of customer selected video/audio content or programming (hereinafter "content") directly to the customer at a time chosen by the customer via a cable TV or other distribution network. This fast growing segment of the entertainment industry is enabled by new technology, but sales are driven by the availability of up-to-date content demanded by consumers.

While the concepts of distribution chain management, inventory management, and point of sale access are common in the world of retail goods, they have historically been difficult to implement in the digital domain where, for example, one might want to design a system for the sale of movies on demand. In the world of physical goods, when the same company operates the distribution, inventory, and retail operations, it is said to be "vertically integrated". By contrast, in the VOD environment, the distribution management, storage management, and data access management are not tightly coordinated. Consequently, when many newly available items, such as recently released movies or time-sensitive content, become available, the distribution system may miss-utilize resources or the network. As a result, the system might lose revenue in that resources and network capacity may be wasted storing content when they could have been used to respond to a customer request (a revenue event) for content.

DSDD systems are growing to meet advancing demands for larger data types, such as video, for different performance needs for readers or writers of data and for the growing maximum simultaneous output of content to customers. These increasing demands further exacerbate the resource contentions mentioned above.

Typically, DSDD systems are comprised of "special use servers" interconnected to meet the demands of a particular application, such as video or web serving. A "storage server" is a type of special use server that allows users to retrieve information from one or a plurality of disks or secondary storage (e.g., a magnetic disk or an optical-disk jukebox).

Storage servers are often interconnected to form a "storage area network" (SAN). Other types of special use servers that provide applications other than storage to users (herein "application servers") may either read from or write to the SAN through a storage server. For example, one type of application server is a web server that accepts user requests to view a particular web page from a web site, retrieves the requested web page from the SAN, and delivers the web page to the user. Another type of application server is a video server that retrieves content from the SAN and delivers it to the user.

One physical server may operate simultaneously as both a storage server and also as an application server. Storage and application servers are typically organized into geographically proximate units called "server complexes" in order to take advantage of technical and financial efficiencies of proximity. Therefore, SANs are typically implemented as a server complex.

The conventional system architecture of DSDD systems may be analogized to those that provide physical goods for sale. For example, DSDD systems may be analogized to the physical process of distributing and selling books. In this analogy, storage servers may be analogous to bookshelves in a stockroom, where the SAN is analogous to the stockroom, and the application server is analogous to the display cases in the bookstore. Architectures that combine the storage server and the application server are similar to a bookstore that has no stock room and in which all the books are on the bookshelves within display cases. The bookstore itself may be analogized to a server complex. Distribution to multiple server complexes is similar to distribution to multiple bookstores.

In a bookstore environment, it is undesirable to have all the trucks delivering books to the same store, at the same time, on the same road and attempting to utilize the same docking bay. It is further undesirable to have the employees that are assigned as cashiers stop their jobs in order to go unload the trucks and stock the shelves.

Fortunately, systems have been devised to ameliorate resource contentions scenarios in the brick and mortar world, such as a bookstore. However, unlike the bookstore example, DSDD systems do not have tightly integrated inventory selection, distribution management, inventory management, and data access management.

For example, in VOD systems, the same CPU and disks that are being used to serve movies to users are typically used simultaneously to stock an incoming movie. In these VOD systems, content is typically made available via satellite feeds from the content provider and placed into the DSDD with little, if any, regard to the number of users currently viewing videos or the amount of storage space available in the server complex. Therefore, incoming inventory may not be available on the desired schedule, it may require allocation of resources that might be more desirable to allocate to displaying existing inventory, or the distribution might even fail altogether, leaving the wrong mix of inventory on the server complex.

Some strategies have been developed for mitigating the resource contentions mentioned above. One widely used strategy in SANs is to employ a "back channel" for server-to-server communications (referred to as out-of-band communication) and a "front channel" for server-to-user communications (referred to as in-band communication). This strategy is much like using the back door of a bookstore to stock the storeroom and using the front door to let shoppers in.

As DSDD systems are being required to turnover larger and larger amounts of data and serve more and more users simultaneously, the strategy of utilizing in-band and out-of-band communication may alleviate some of the concerns mentioned above. However, this strategy will ultimately fall far short, because the SAN is still a shared resource to both communication networks. The CPU cycles for receiving data over the out-of-band network compete with CPU cycles for putting data on the in-band network. Similarly, there is potential competition for the disk bandwidth of a disk in the SAN that is simultaneously receiving new data inventory and playing out existing data inventory. This competition for resources is analogous to an unfortunate store clerk attempting to simultaneously take boxes off the truck and work as a cashier.

There are many obstacles to overcome in order to implement a vertically integrated DSDD system when resources are not dedicated to exclusive tasks. Among other issues, the system must know what is currently happening and what to do when unexpected failures occur.

Returning to the bookstore analogy, if all the trucks are sent to the same loading dock but one breaks down in the dock, none of the trucks will be able to unload their cargo. In this situation, human intervention may direct unloading to occur at another location.

In a DSDD system, the complex tasks of handling resource and performing real-time corrections need to be done without human intervention. The sheer number of resources that might be involved —millions of packets of information per second stored on hundreds of disks being written to tens of machines and read by thousand—tends to make the logistical issues more complex in the digital domain.

Finally, in DSDD systems, resource reservation schemes are notoriously difficult to implement because of the vast number of permutations of programs that may be running at any given time. For example, if there are four programs running on a special use server, and each program may perform any one of ten functions, there are over 1,000,000 possible resource states. Because of the extreme difficulty of examining source code and computing the expected resource load of a computer process, "system benchmarks" are empirically derived. Of course, it is infeasible to benchmark all the states of even the very simplest of systems, such as in the previous example, with four programs and over 1,000,000 states.

This issue is similar to issues that arise in brick and mortar distribution systems. In the bookstore distribution example, it is infeasible to plan resource utilization in terms of the horsepower of the trucks or the intelligence of the store manager. Rather, each link in the distribution chain is quantized in terms of moving or consuming books, i.e., how many books the truck can carry, how many books the store room can hold, how long it takes to transfer a truck load of books from the truck to the stock room, etc.

Conventional DSDD systems do not quantize resources in terms of the main application, the DSDD system servers. Rather, existing DSDD systems typically build on the quantization units of the system component, e.g., megahertz of processing power, megabytes of RAM, or megabytes of disk throughput. While capabilities of specific special use servers of a DSDD, such as a web server or video server, may be quantized according to their main uses, e.g., serving web pages or video streams, vertically integrated DSDD systems which quantify all their sub-components in terms of their main use have not yet been developed.

There is therefore a need in the art for a vertically integrated DSDD system that quantizes system resources in terms of the main use of the system such that the resource management issues above may be addressed by allowing the DSDD system to optimize resources and the network by assigning exclusive resources for each task. This would enable a particular storage server's resources or a portion of its resources to, over a given period of time, be tasked exclusively with the reception of incoming data while another portion of the storage server's resources or another storage server's resources would be tasked exclusively with the play out of existing data.

SUMMARY

According to exemplary embodiments, systems and methods are provided for controlling receipt and distribution of scheduled data in at least one server complex.

According to one embodiment, at least one resource manager dedicated to at least one server complex manages resources and determines resources available in the server complex for performing at least one of specific tasks including receiving the scheduled data from a data source, storing the received data, and transmitting the received data to a user. A schedule director receives a schedule representing inventory of data available from the data source and desired times for distributing the data to the server complex. The schedule director coordinates with the resource manager to reserve resources in the server complex for performing at least one of the specific tasks based on the schedule and the resources determined to be available by the resource manager.

According to another embodiment, receipt and distribution of scheduled data received in at least a first server complex and delivered to at least a second server complex is controlled. At least one resource manager dedicated to the first server complex and the second server complex manages resources and determining resources available in the first server complex and the second server complex for performing at least one of specific tasks including receiving the scheduled data from a data source, storing the received data, and transmitting the received data to a user. A schedule director receives a schedule representing inventory of data available from the data source and desired times for distributing the data to the first server complex and the second server complex. The schedule director coordinates with the resource manager to reserve resources in the server complex for performing at least one of the specific tasks based on the schedule and the resources determined to be available by the resource manager.

According to exemplary embodiments, one resource manager may manage resources in multiple server complexes, and/or each server complex may have its own dedicated resource manager. Resources in the network for delivering data from one server complex to another server complex may also be reserved.

According to exemplary embodiments, resources in one server complex are reserved to perform at least one of the specific tasks, independent of other resources in the same server complex or another server complex. Conflicts between resources needed to distribute data according to the schedule and resources available in the server complex may be resolved based, for example, on predetermined business rules.

DETAILED DESCRIPTION

According to an exemplary embodiment, a method and system are provided for quantifying resources in a scheduled data distribution system, such as a DSDD system, in terms of the main use of a special use server, and, in response to operator input, assigning portions of particular resources in the system to exclusive tasks. For example, according to an exemplary embodiment, a dedicated server machine in a server complex may be pre-determined as a write only storage server, and that machine may not be used for application serving.

According to an exemplary embodiment, an input mechanism allows an operator to specify at least a first source of data, at least a first data set from each source and at least a first destination to which to deliver each data set. A schedule director coordinates with one or more resource managers to determine the resources available on and between the transmitting and receiving server complexes such that at least a first input pathway for the incoming data set and at least a first server on which the data is to be stored are selected to enable a sufficient portion of the resources of the specified system components to be exclusively allocated to the assigned task.

According to one exemplary embodiment, each resource manager has the exclusive purview to reserve resources in its own server complex. According to another exemplary embodiment, the resource manager of one server complex, e.g., the transmitting server complex, requests current resource utilizations and has the ability to make resource reservations on other server complexes. In another embodiment, current resource utilizations are transmitted periodically by the components of the system to at least a first resource manager serving one server complex that may make resource reservations on other server complexes.

According to one exemplary embodiment, data sets available for capture and distribution from a data source may be presented to the operator through a visual grid, with time depicted on one axis and data sources on another axis.

Figure 1A:
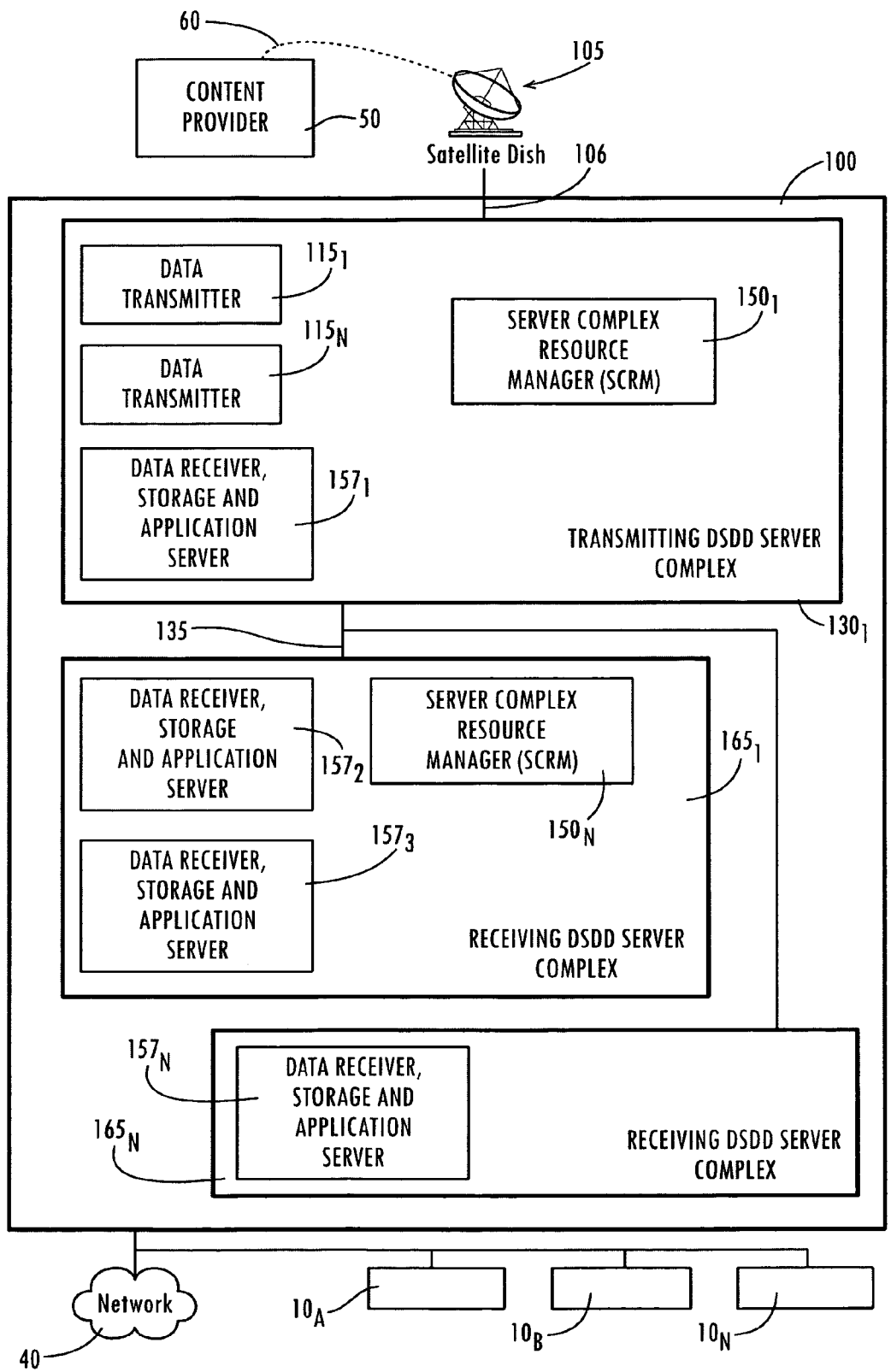
FIG. 1A illustrates an exemplary conventional DSDD system.

To aid in understanding of the invention, a traditional DSDD system, illustrated in FIG. 1A as system 100, is first described. For ease of explanation, the description that follows shall use the terminology for a cable network. However, it should be appreciated that the present invention is not limited to cable networks but can be implemented on other types of networks, even though the terminology might be different.

Cable networks (and other networks) are typically divided into distinct geographical areas or systems serving subscribers in the areas. In large regions, such as the United States, there are typically Multiple System Operators ("MSOs"), each operating multiple systems. However, a system may cover a continent or the world if the components communicate together as herein described to perform an integrated task.

A conventional DSDD system typically includes a transmitting server complex $130_1$ and one or more receiving server complexes $165_1 \ldots 165_N$. The transmitting DSDD server complex $130_1$ may include various components, including a data storage and application server $157_1$, for storing content via known storage technology, such as a disk array, a JBOD (Oust a bunch of disks), or a RAID (redundant array of inexpensive disks). Each transmitting DSDD server complex typically also has a server complex resource manager (SCRM) $150_1$ that manages the activity of that particular server complex $130_1$.

Each DSDD system is typically connected to a receiver 105 to receive content from one or more content providers 50. Content transmission from the content providers 50 to the system 100 is often achieved via a satellite feed 60 and a local feed 106. However, any other type of communication link may be used for content transmission, such as an ATM network, a terrestrial link, or any other appropriate transmission link. Also, content transmission may be achieved manually, e.g., via a tape or disk.

The receiver 105, though co-located with the system 100, is typically seen as an external, or "unmanaged", data source to the system 100 in that prior to being able to utilize data on the receiver 105, that data must first be copied onto a storage server $157_1$, and the copying cannot be regulated by the system 100. Because the receiver 105 is unmanaged, there are ramifications to the data storage and application servers because the level of resources that may be available for receiving and storing data are unpredictable.

After receipt of content and copying of the content onto a data receiver, storage and application server $157_1$, the stored data may be pushed to or pulled by one or more receiving DSDD server complexes $165_1, \ldots, 165_N$ that need copies of the data over a distribution network 135. The pushed or pulled data may be stored in one or more combined data receiver, storage and application servers $157_2, 157_3, \ldots 157_N$.

The DSDD system 100 is capable of storing quantities of content and is used to store, manage, and deliver quantities of content across an interactive network 40 upon the request of one or more customers 10a-10n. The interactive network 40 may be any type of network capable of transferring data electronically, such as, but not limited to, cable networks, the Internet, wireless networks, Telco networks, or satellite networks. The customers 10a-10n are the end-users who will receive the content for use (e.g., viewing).

In addition to the devices shown, it will be appreciated that a typical DSDD network may also include network equipment that provides the managing, processing, and modulation, as appropriate, for the delivery of the content across the network to the customer's interface device. This equipment may include, for example, a set-top-box, personal computer, lap-top, personal digital assistant, cellular phone or the like.

One problem with the conventional DSDD system 100 is that there is no resource coordination between the external data source 50, the receiver 105, and the SCRM $150_1$. Also, there is no resource coordination between the transmitting server complex $130_1$ and the receiving server complexes $165_1 \ldots 165_N$. This lack of resource coordination has begun to present problems that are addressed according to exemplary embodiments.

In a traditional VOD DSDD system, content is comprised predominantly of movies. This content is periodically transmitted to the DSDD system 100 via a satellite feed 60. This is possible because the content is a predetermined subset of programming that may be made available to customers 10a-10n whenever the system 100 has properly loaded the content. Since time is not of the essence in such a system, content may be captured and propagated throughout the system 100 during off-peak times when resources and the network 135 are expected to be at maximum capacity. However, as the popularity of these VOD systems grows, the off-peak hours are no longer sufficient to capture and propagate the videos that the customers desire to watch.

Furthermore, on-demand systems are evolving into an everything on-demand (EOD) model, whereby all viewing is on an on-demand basis. In the EOD systems, all content must be captured when broadcast ("live") and immediately made available for viewing. Thus, very shortly after a broadcast of data begins, the content is made available for viewing nearly live or anytime thereafter. With such an EOD system, a customer may view the "6:00 news" at 6:01, 6:43, or 8:09 or any other time the customer pleases.

Of course, the traditional VOD content, such as movies, and the EOD type content must compete for resources. Conventional systems, like the DSDD system 100, neither regulate the incoming inventory from the receiver 105 nor fully take into account the consequences of utilizing shared resources between server complexes, such as the distribution network(s) 135. Also, current on-demand systems do not take into account ramifications of sharing resources on all the dependent resources on and between the combined storage and application servers.

Using the brick and mortar world bookstore analogy described above, in which distribution of content may be considered to be analogous to distribution of books, sending VOD and EOT content without resource management would be analogous to delivery trucks being sent to the bookstores without any advance warning. In the bookstore environment, this may result in too many trucks arriving at a store at a given time, trucks with undesirable inventory arriving before trucks with desirable inventory, and the store having a poor inventory selection. Furthermore, workers may put down other chores to unload these trucks, and other crucial tasks, such as setting-up display cases, helping customers, and ringing up sales, may get neglected.

Similarly, to enumerate but a few of the issues in the traditional DSDD system 100, the transmissions of data from the receiver 105 to the transmitting server complex $130_1$ are unpredictable, there is no coordination between the transmitting server complex 130, and receiving server complexes $165_1 \ldots 165_N$, and the distribution network 135 may become overloaded with traffic. Also, any or all of the server complexes $130_1$, $165_1 \ldots 165_N$ may experience insufficient resources to write the incoming video data to disks, may have too few CPU cycles to write the data, and/or may steal CPU cycles from the task of playing movies to viewers already watching a particular program. These problems are significantly aggravated in an EOD system.

To continue the bookstore analogy, an EOD system is like a bookstore hosting events, selling newspapers, comic books, magazines, and books at the busiest corner in New York City. Not only are books being delivered, but some content (events) is delivered and watched "live", some content is time dependent (newspapers) and circulated more often than daily, some content is semi-time dependent (magazines and comic books) and circulated monthly on a staggered basis, and some content is relatively static (books). All the content must be available for purchase on demand.

The pressing need to have integrated resource coordination and management is one problem addressed according to exemplary embodiments.

Figure 1B:
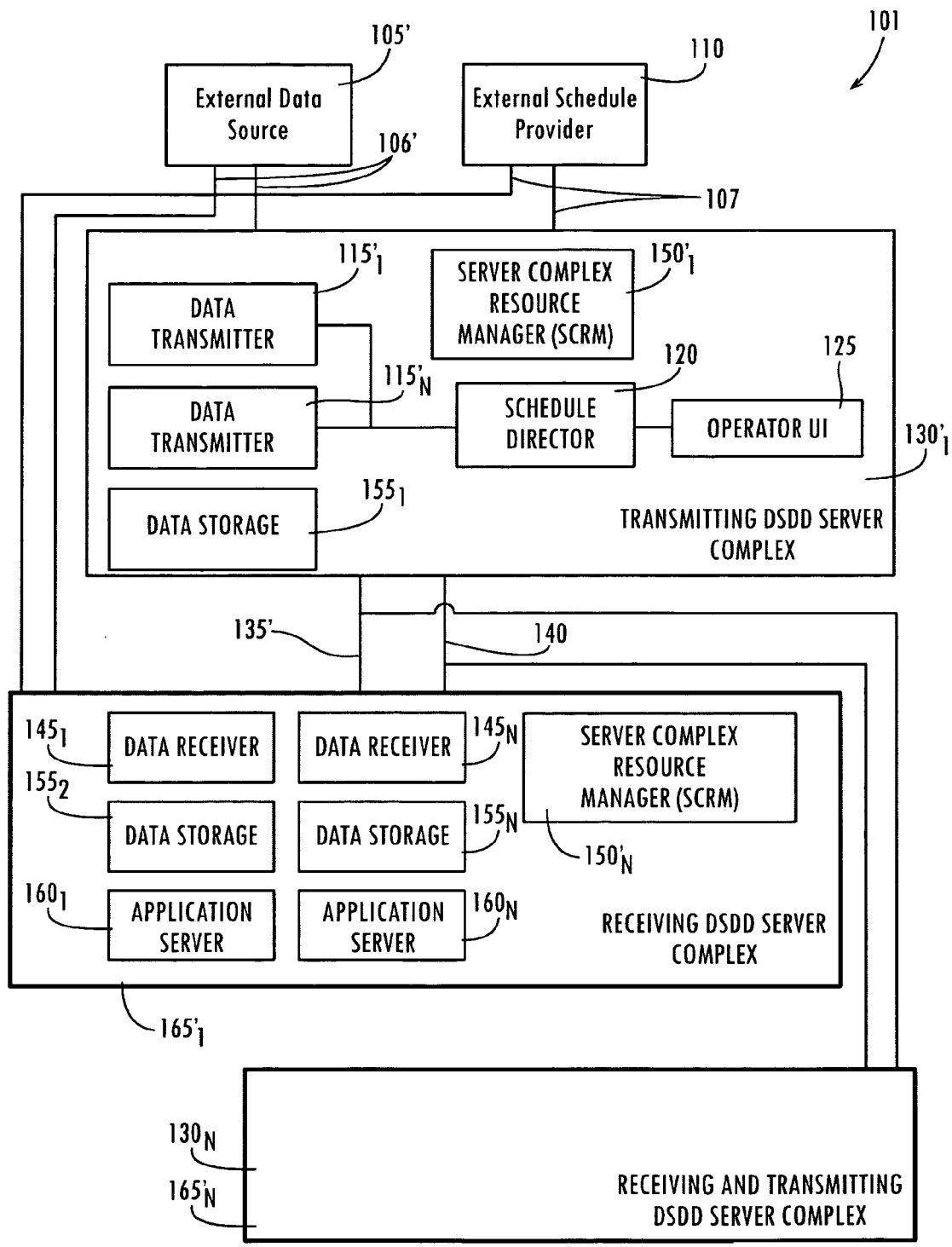
FIG. 1B illustrates an exemplary DSDD system according to an exemplary embodiment.

An exemplary system for delivering data in an efficient manner, with control of shared resources, is shown in FIG. 1B. Although the system in FIG. 1B is a DSDD system, it will be appreciated that the invention is applicable to any type of content delivery system.

FIG. 1B depicts a DSDD system 101 for distributing scheduled data according to an exemplary embodiment. According to an exemplary embodiment, the DSDD system 101 may be a VOD system in which video streams are served, and system resources are quantized in terms of video stream units. Currently, the standard video streaming rate is 3.75 Megabits/second pursuant to the Motion Picture Experts Group (MPEG 2) standard, but as technology for streaming evolves, this transfer rate is expected to improve. Of course, the streaming rate may be different for different types of content (e.g., standard definition versus high definition), but specific standards for each type exist.

In addition to receiving and distributing content, the DSDD system 101 may distribute other types of data, e.g., data used to present the content to the customer in a usable form. In a VOD environment, for example, "trick files" may be distributed to provide, e.g., fast forward, rewind, and index capabilities for the user. According to an exemplary embodiment, these trick files may be generated by one or more of the server complexes $130_1'$, $165_1'$, ... $130_N'$, $165_N'$ in the DSDD system 101. This saves bandwidth to the DSDD system from the external data source. Of course, this data may also be generated outside the DSDD system 101 and transmitted to the DSDD system along with the content.

The DSDD system 101 is made aware of a provider's inventory and desired distribution schedule by a schedule provided, e.g., by an external schedule provider 110. The schedule provides descriptive data (such as content type, title, source, participants, summary, rating, time length, etc., herein referred to as "metadata") regarding the inventory of data available from the external data source 105'. According to an exemplary embodiment, the metadata includes at least the time and an estimate of the size of the data, and, if more than one datapath is possible, the path to the data.

According to an exemplary embodiment, the DSDD system 101 includes at least one transmitting server complex $130_1'$ for receiving data from a content source 105' via an appropriate communication link 106', which may be similar to the communication link 106 described above with reference to FIG. 1A. The transmitting server complex $130_1'$ provides the received content to at least one receiver complex server $165_1'$ for storage. In addition, or instead of, having a transmitting DSDD server complex $130a'$ that is distinct from a the receiving DSDD server complex $165_1'$, there may also be at least one combined transmitting/receiving DSDD server complex, depicted in FIG. 1A as $130_N'$ and $165_N'$. Also, the receiving DSDD server complex $165_1'$ may receive content directly from the content source 105' via the communication link 106' or another appropriate communication link.

The process of coordinating resources in the system may be instigated by a schedule director 120 included in the transmitting server complex $130_1'$. The schedule director 120 negotiates with the server complex resource managers (SCRMs) $150_1' \ldots 150_N'$ for reserving resources to receive and store the content, according to a schedule provided by the schedule provider 110 via a communication link 107. The communication link 107 may be the same as or be of the same type as the link 106', or the communication link 107 may be any other appropriate link for transmitting schedule data. The schedule may be modified or optimized, e.g., by an operator via a operator user interface 125. The schedule director 120 may negotiate with the SCRM $150_N'$ over a control network 140, which may be different than the data distribution networks 135' used for delivering content from the transmitting server complex $130_1'$ to the receiving server complex $165_1'$. The data distribution networks 135' may be composed of one or more physical networks.

Assuming that the schedule director 120 and the SCRMs $150_1'$ ... $150_N'$ successfully negotiate for resources, a data distribution may occur at some point in time with the data to be transmitted by one of the data transmitters $115_1'$ ... $115_N'$ and received by one of the data receivers $145_1$ ... $145_N$ in the receiving DSDD server complex $165_1'$ ... $165_N'$. The data receivers may be connected to one or more the distribution networks 135'.

According to an exemplary embodiment, different physical devices may be dedicated to be the data transmitter 115', the data receiver 145, the storage server 155, and/or the application server 160. While placing different logical functions, such as storage, transmitting, and receiving, onto different physical devices is not necessary, it may make the job of the SCRM easier in that portions of dependent resources will be easier to allocate.

Data may be transmitted to customers from the receiving DSDD server complex $165_1'$ and/or the combined transmitting/receiving DSDD server complex $130_N'$ and $165_N'$. The data may be delivered to the customers via a network, such as the network 40 shown in FIG. 1A.

Although only one distribution network 135' is depicted in FIG. 1B, it will be appreciated that there may be many distribution networks. The use of multiple networks may help ameliorate data bandwidth issues by allowing scheduling of distributions onto different networks—much like different loading bays facilitate receipt of books at a bookstore. However, the practice of scheduling distributions on different networks may still imply a conflict in resources, just as one might find in a warehouse when there are not enough people to unload the trucks at the different loading bays. Furthermore, as the number of movies and TV shows to display through the VOD system increases, it is unlikely that the system operator will find it acceptable to only allow a single distribution on a single network, especially when there is extra bandwidth available.

Although not illustrated, a schedule director may also be included in the receiving DSDD server complex $165_1'$ for receiving a schedule of inventory availability from the external schedule provider 110 and negotiating resources for delivery of that inventory to the server complex. In this case, the schedule director negotiates with the SCRMs $150_N'$ for resources. An operator user interface may also be included in the receiving DSDD server complex $165_1$.

By negotiating with the SCRMs $150_1'$ the schedule director 120 is able to ensure that the proper piece of content (dependent in part upon the metadata to identify the content) is sent to the proper location to maximize system efficiency and the ability to generate revenue. The schedule director 120 is thus able to coordinate the delivery of content. This is important so that content can be delivered when a receiving DSDD server complex is best able to ingest the content.

For example, the schedule director 120 may determine that a particular server complex is too busy providing content to customers to store a new piece of content. Thus, the schedule director 120 may determine to delay sending the piece of content to the server complex or may send the piece of content to another server complex that can, at a more opportune time, forward the piece of content to the currently busy server complex.

In understanding the complexity of directing the distribution of content, it is important to understand that different functions performed by the DSDD server complexes require different capacities. For example, a server complex may be able to read 10× faster than it can write to a particular storage medium. This is analogous to the bookstore wherein an employee can unload ten times as many books as an employee can properly display. The bookstore and a VOD system can be optimized by assigning exclusive tasks to particular workers/machines. However, the tasks cannot be effectively and efficiently assigned without a resource manager or, in the case of a bookstore, a manager.

Figure 2:
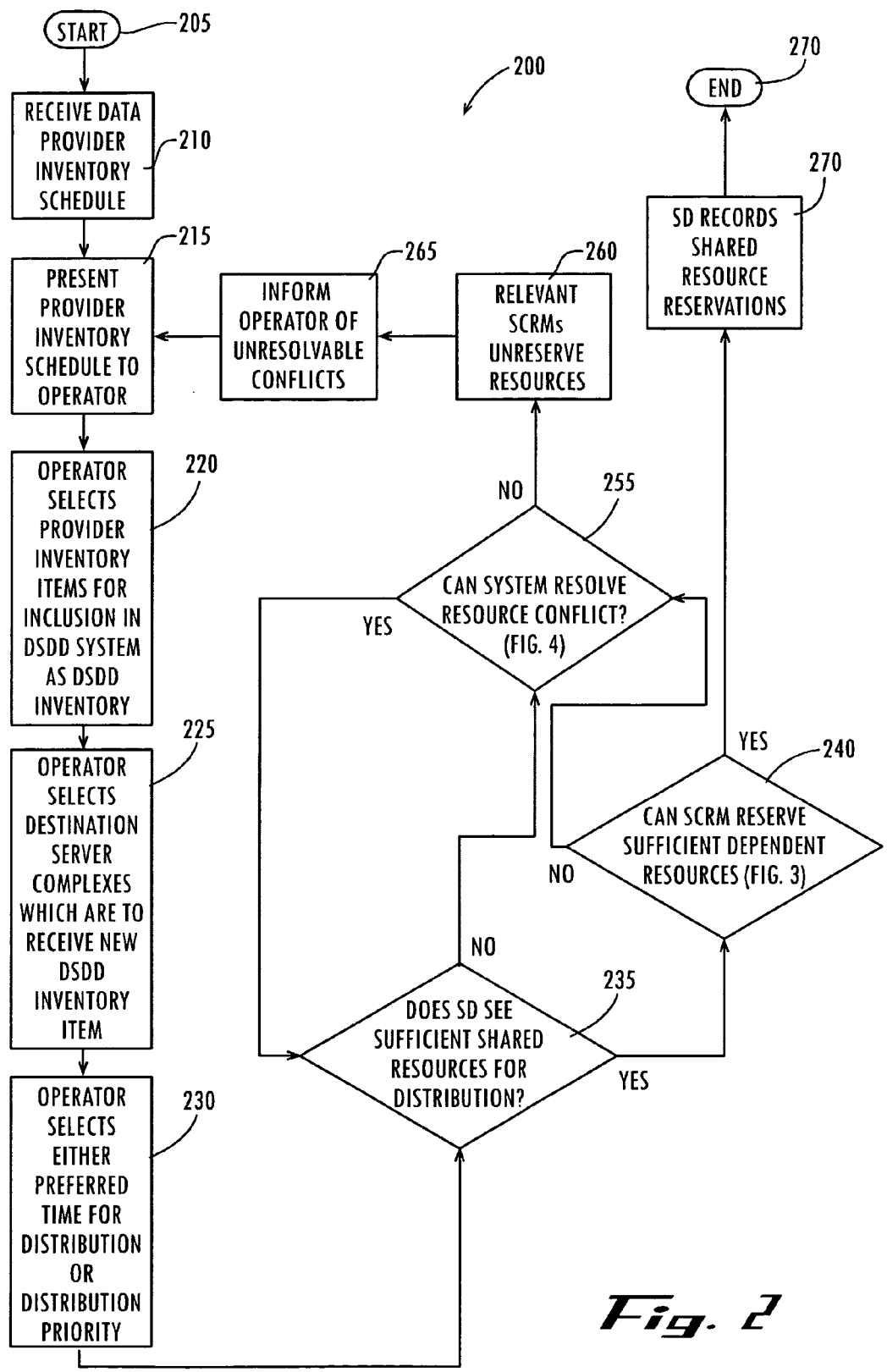
FIG. 2 illustrates an exemplary process for controlling receipt and distribution of scheduled data via a server complex according to an exemplary embodiment.

FIG. 2 depicts an exemplary process 200 for controlling receipt and distribution of scheduled data via a server complex. For illustrative purposes, the following description is directed to resource allocation in a DSDD system. It will be appreciated, however, that similar steps may be used for allocating resources and controlling receipt and distribution of data in any scheduled data distribution system.

Referring to FIG. 2, once the process is initiated at step 205, an inventory schedule is received from the content provider at step 210. This inventory schedule may be periodically accessed by the DSDD system. The available provider inventory is presented to an operator at step 215 so that the operator may select from the items to bring into the DSDD system at step 220. This selection may be made using a user interface, such as that depicted in FIGS. 5A and 5B. Once the DSDD system operator selects a piece of provider inventory at step 220, the operator selects one or more destination server complexes to which the provider inventory should be distributed at step 225. Furthermore, the operator selects either a preferred time or a distribution priority for distributing the selected provider inventory at step 230. Of course, the time for distribution may not be earlier than the time the provider first makes the inventory available.

The schedule director 120 for the server complex $130_1'$ acts as a relay from the external data source 105' to any of the other server complexes $165_1'$ ... $165_N'$ that were selected by the operator in step 220, and attempts to schedule the reservation of resources, such as the network bandwidth on network(s) 135' shared between the aforementioned server complexes. The schedule director 120 determines whether there are sufficient resources for distribution at step 235.

If there are not sufficient resources for distributing the data, e.g., because resources are reserved for another task, a determination is made at step 255 whether the system can resolve the resource conflict. The decision at step 255 may rely on business rules set up by the operator, the processing of which will determine whether there is another allowable time for the distribution to occur. If the conflict can be resolved, the schedule director 120 attempts to reserve resources again. Otherwise, an attempt is made to unreserved resources at step 260. For example, if the operator specified a single mandatory distribution time (rather than a priority) in step 230, and that distribution would conflict with other distributions already scheduled at the same time, the operator is informed of an irresolvable resource conflict at step 265. If the distribution is priority based, or if the provider inventory does not immediately go stale after its first availability time, business rules within the schedule director may allow resolution of the resource conflict in step 255.

If, at step 235, it is determined that there are sufficient shared resources, the schedule director 120 in the transmitting server complex $130_1'$ communicates with the SCRM of the receiving server complex $150_N'$ at step 240, requesting that this SCRM reserve sufficient future resources on the receiving server complex $165_1'$ to ensure that the distribution may occur as planned and that the various resource managers are aware of the potential utilization of shared resources. Further details regarding communications between the schedule director and the SCRMs are given in FIG. 3.

Each SCRM must take into account resource dependencies that indicate that if one resource were to be used on a device, e.g. a disk drive, then other resources on the device, e.g. a CPU, would also be used. If, at step 235, it is determined that there are insufficient dependent resources on any one of the server complexes selected to receive the distribution, then at step 255 a determination is made whether the resource conflict is resolvable. This is described in further detail with regard to FIG. 4. If there are no resource conflicts, and sufficient resources can be reserved, then the schedule director 120 may finalize the resource reservations at step 270.

If, at step 255, it is determined that one or more of the server complexes selected in process 225 can be skipped over, step 235 is retried with the conflicted server complexes excluded.

If it is determined at step 255 one or more of the non-resource conflicted server complexes should not receive the distribution because other resource conflicted server complexes could not receive the distribution, then at step 260, the non-resource conflicted server complexes must un-reserve the resources reserved for the distribution. If, at step 240, no SCRM reports a resource conflict, the schedule director 120 may finalize its resource reservations for the shared resources 135'.

Continuing the book distribution analogy, the operations manager who sends a truck of books to a store must first confirm with the store that it will not only be able to receive those books (i.e., unload and stock them), but also that the reception of the inventory will not interfere with the unloading of a truck that was previously sent to the same store and thereby throw-off other schedules. Similarly, the schedule director of one server complex, e.g., 120, must be able to depend on the SCRM of the other server complexes to allocate resources such that the schedule director can rely on the receiving server complex to both receive the distribution and not interfere with other distributions.

Figure 3:
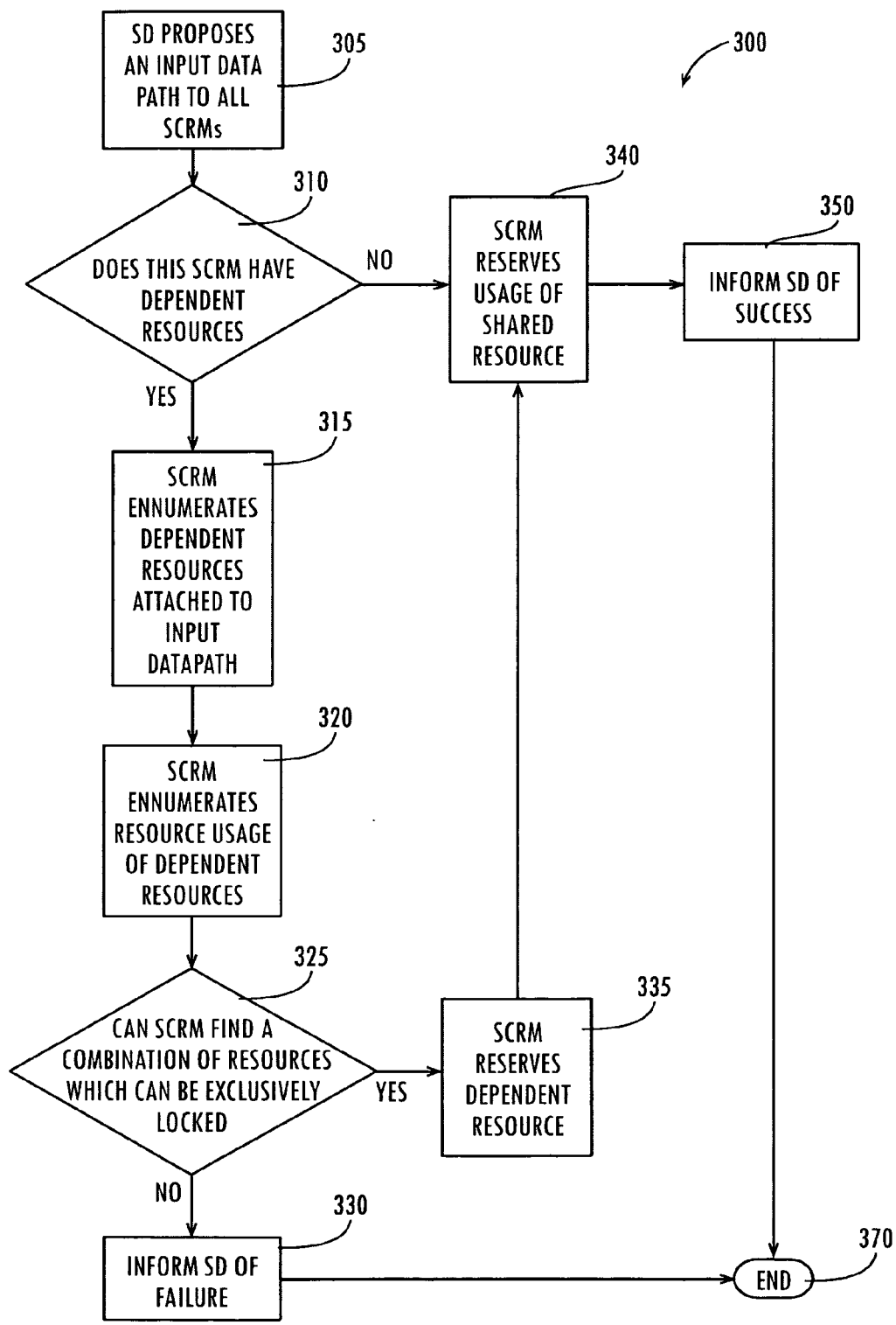
FIG. 3 illustrates an exemplary process for resource reservation within a server complex according to an exemplary embodiment.

FIG. 3 depicts an exemplary process 300 for resource reservation within a server complex. An input data path is initially proposed, at step 305, by the schedule director 120 of the transmitting server complex. The input data path defines sufficient information for the receiving server complex resource manager 150$_N$' to determine eligible points of entry for the data into the server complex and whether those points of entry imply downstream resource utilization unknown to the to the transmitting server complex schedule director 120. A determination is made at step 310 whether there are dependent resources within the server complex. If not, then, at step 340, the SCRM notes the reservation of the shared resource, typically bandwidth on network(s) 135', informs the schedule director 120 of the successful reservation at step 350, and the process ends at step 370. If, at step 310, it is determined that there are dependent resources within the server complex necessary to receive the data, e.g., CPU cycles or fiber channel bandwidth on the storage server, then at step 315 the SCRM enumerates the resource dependencies of resource chains starting at the input path.

At step 320, the SCRM matches the resource chains with the resource reservations pertinent to the time period of the requested distribution. At step 325, the SCRM then analyses the pertinent resource and reservation information to find a chain or chains with sufficient free resources to accomplish the task. It should be noted that step 325 does not necessarily employ a cost minimization algorithm, such as the well-known Dijkstra algorithm. Rather, step 325 only requires that sufficient resources, as defined by the resource quantization units of the system, are available in each link of the resource dependency chain.

For example, suppose the DSDD system is a VOD system in which the stream units are in terms of 3.75 Mbit/sec video streams. Further, suppose that the dependent resource chain in the server complex consists of the input path connected via an Ethernet connection to the storage server on the SAN, where the input path is a shared resource with a maximum throughput of 50 stream units with reservations at the planned distribution time for 40 stream units, the storage server has a maximum throughput of 20 stream units with reservations for 10 stream units, and the SAN has a maximum throughput of 1000 stream units with reservations for 900 stream units. In this example, an input of 5 stream units would be feasible—since more than 5 stream units are available at each link in the chain—whereas an input of 20 stream units would not be feasible.

If a suitable resource chain can be found in step 325, then at steps 335 and 340, the SCRM reserves the dependent resources during the requested distribution time and reserves the shared resources, respectively. At step 350, the SCRM informs the schedule director 120 of its success, and, at step 370, the process ends. If the SCRM cannot find a suitable resource chain, then it informs the schedule director 120 of its failure at step 330, and the process ends at step 370.

It is the job of the schedule director 120 to analyze, project, and reserve the shared resources between server complexes, such as the distribution network(s) 135'. However, it cannot always be assumed that sufficient resources exist to schedule all desired tasks without conflict. While the schedule director 120 may be able to side step resource contentions on the shared resources between server complexes, it must nonetheless coordinate with the receiving server complexes to ensure that no conflicts exist within the receiving server complex. Much like a bookstore having two employees that cannot simultaneously unload three trucks and sell books at the same, resources within the server complexes 165$_1$' ... 165$_N$' may be not be sufficient at all times to, for example, write one movie to a storage server while reading other movies on the same storage server. In these circumstances, a process for conflict resolution may be used.

Figure 4:
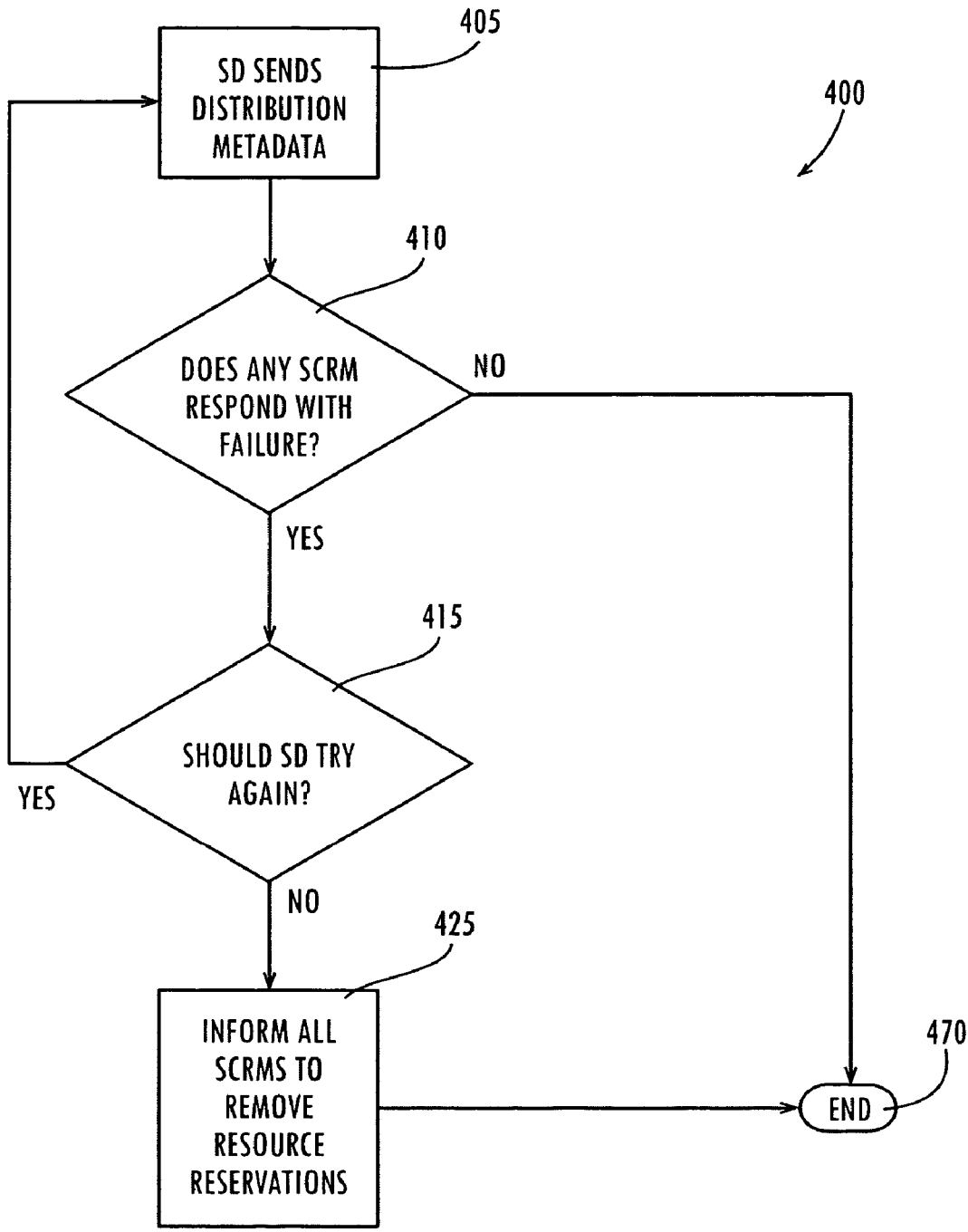
FIG. 4 illustrates an exemplary process for resolving resource conflict according to an exemplary embodiment.

FIG. 4 depicts an exemplary process 400 for resource conflict resolution. At step 405, the schedule director 120 transmits the metadata for the proposed distribution (e.g., input path, time, duration) to each SCRM of the conflicted server complexes. A determination is made at step 410 whether any of the SCRMs have responded with a failure. If, as per process 300, there are still SCRMs that respond with a failure, the schedule director determines, at step 415, whether it may try some variant of the distribution, e.g., a slightly different time, assignment to an alternate path on the data distribution networks 135', or even exclusion from the distribution of some of the server complexes. If the schedule director 120 should abort the distribution, it must inform all the relevant SCRMs at step 425 to remove the resource reservations for the shared resources.

If, at step 415 it is determined that the schedule director should try some variant of the distribution, it sends a new set of distribution metadata at step 405. This process is repeated until no SCRMs respond with failure at step 410, or the schedule director realizes that the distribution should be abandoned to some or all of the server complexes at step 425. Then, the process ends at step 470.

Figure 5A:
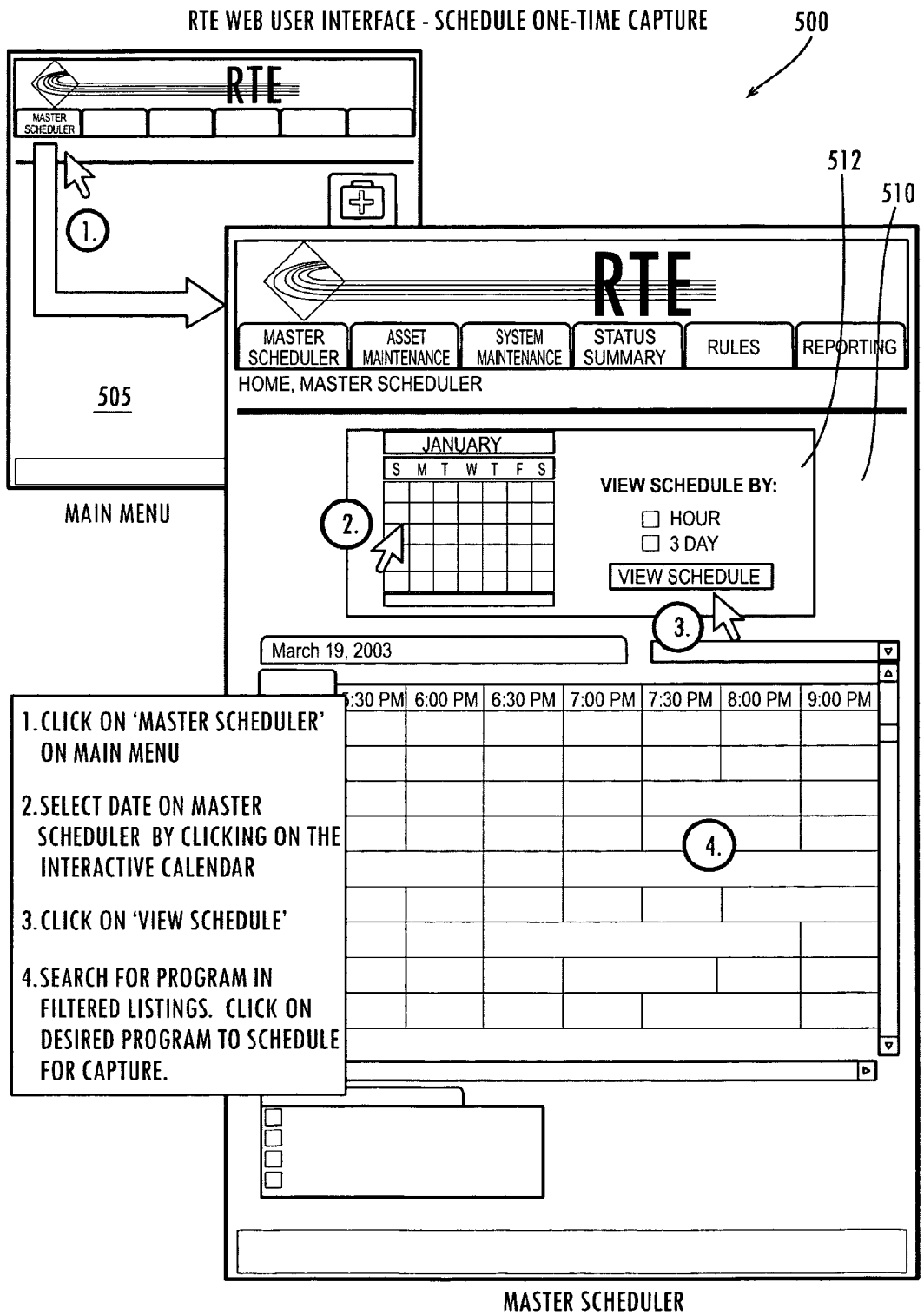
FIGS. 5A and 5B illustrate an exemplary user interface for specifying source data and distribution destinations.
Figure 5B:
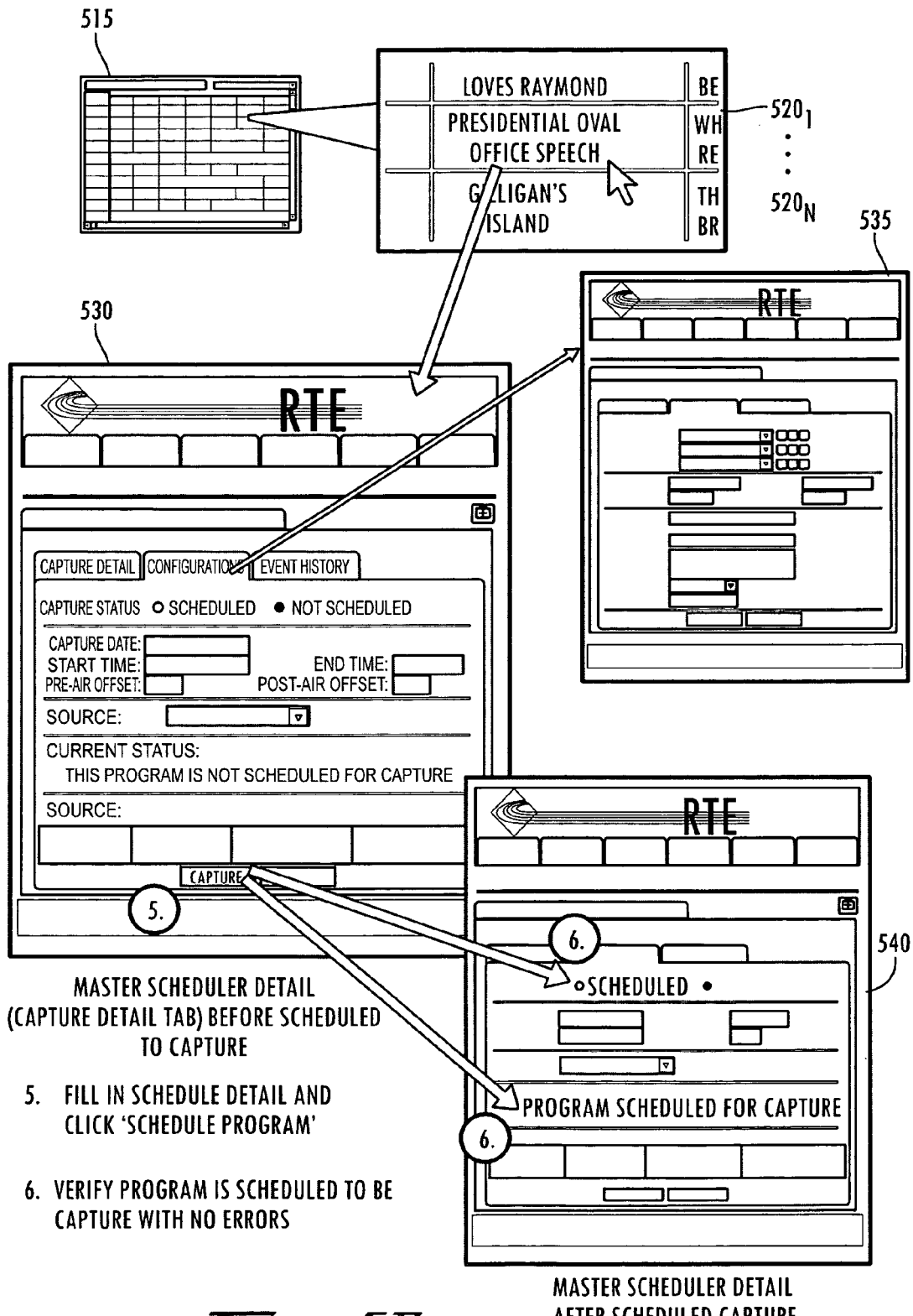

FIGS. 5A and 5B depict an exemplary user interface that may be used by an operator for scheduling distribution. The exemplary user interface contains a main menu, 505 from which the system operator may schedule distributions. The operator selects the "master scheduler" (step 1), and a screen 510 is displayed, including an interactive calendar 512. The operator selects a date on the calendar (step 2) and clicks on a "view schedule" button (step 3) to cause previously scheduled distributions, as well as potential inventory distributions, to be displayed for the selected date. In the context of a VOD system, the inventory may include TV programs or movies. In a VOD system, a grid representation, 515, of potential distributions may be desirable because various providers each have their own "feed", and only one piece of distribution schedule item, e.g., the Presidential Oval Office Speech, 520, may be transmitted at a time over that feed.

According to an exemplary embodiment, within the grid 515, the distribution schedule items $520_1, \ldots, 520_N$ may be individually colorized to denote the status of the potential distribution. An exemplary colorization of the distribution schedule items $520_1, \ldots, 520_N$ is green for items that have been successfully scheduled, red for items that have been proposed for scheduling but the scheduling process encountered errors, blue for items that the system is suggesting may be desirable items to the operator, and white for items that have not been scheduled for capture and distribution nor should be specially drawn to the attention of the operator.

The operator may search for a program in the filtered listing and click on a desired program to schedule capture of the program (step 4). Selection of a distribution item brings the operator to a screen 530 such as that shown in FIG. 5B. The screen 530 allows additional information and/or overriding information to be entered regarding the scheduled item. For example, the operator may choose to override the system-proposed distribution time, add a descriptive comment to the distribution or go to a screen 535 to configure a "distribution profile" and other default information.

Once the operator fills in the schedule details and clicks the "schedule program" button (step 5), the operator may verify that the program is captured with no errors using screen 540 (step 6). The screen 540 presents detailed information regarding the schedule item such as whether the scheduling succeeded, its start time, its endtime, etc.

Figure 5C:
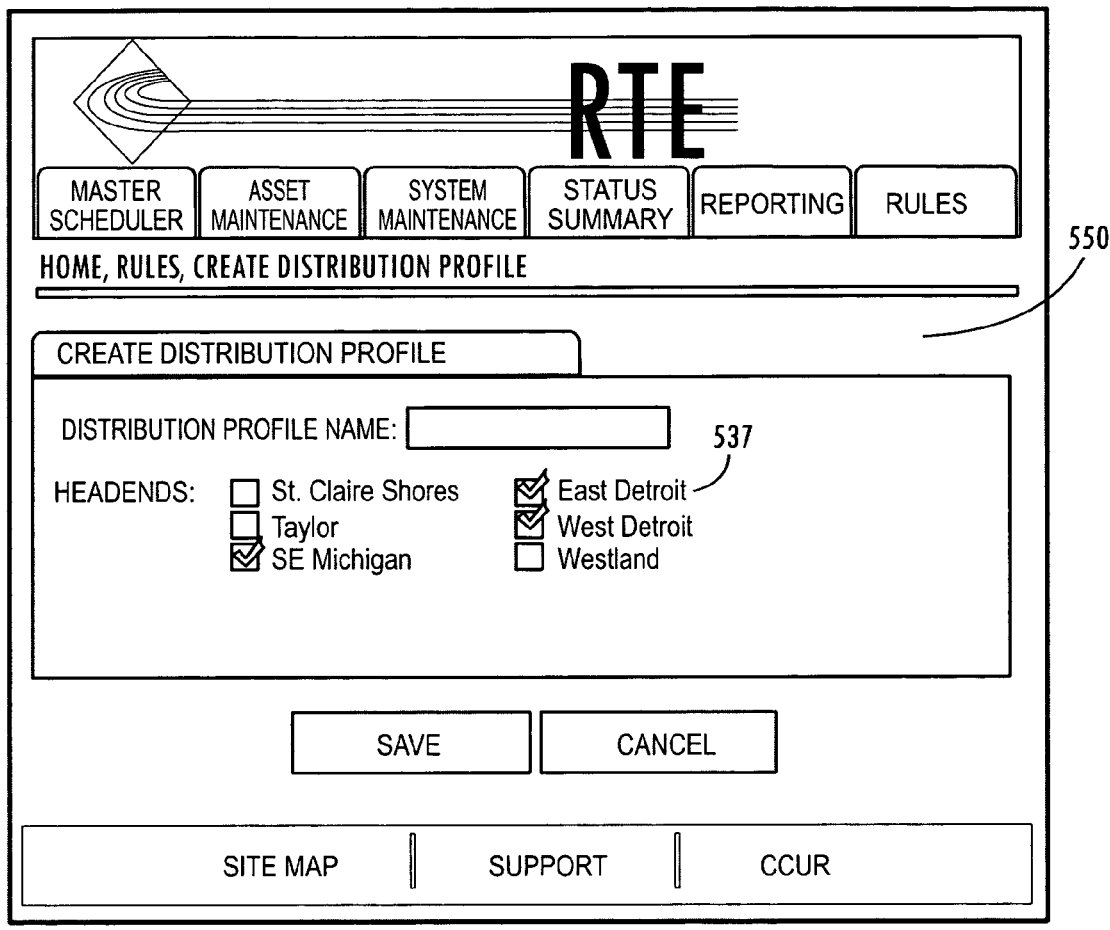
FIG. 5C illustrates an exemplary user interface for specifying a distribution profile.

FIG. 5C depicts an exemplary user interface 550 for specifying a distribution profile. A "distribution profile" 537, depicted in FIG. 5C, may be used for determining the receiving server complexes $165_1', \ldots, 165_N'$ that the operator desires to distribute the movies to.

According to exemplary embodiments, scheduled data is distributed efficiently by controlling and coordinating resource utilization among various parts of the distribution chain so that in any state, a given resource is either unallocated or allocated for a specific task. In the continuing book distribution analogy, when the distribution of books has been coordinated correctly, the end result is that resources (trucks, docking bays, people, etc.) will have specific tasks (unload the truck, man the cashier, etc.) to accomplish at different times of the day, and, once these tasks are assigned they should neither conflict with other tasks, nor be abandoned at will. Just as it would be detrimental in a bookstore environment to have one person attempt to both unload the trucks and act as the cashier, it would be similarly detrimental in a DSDD environment to have the same CPU cycles allocated to writing data to the SAN as well as playing video to customers.

Figure 6:
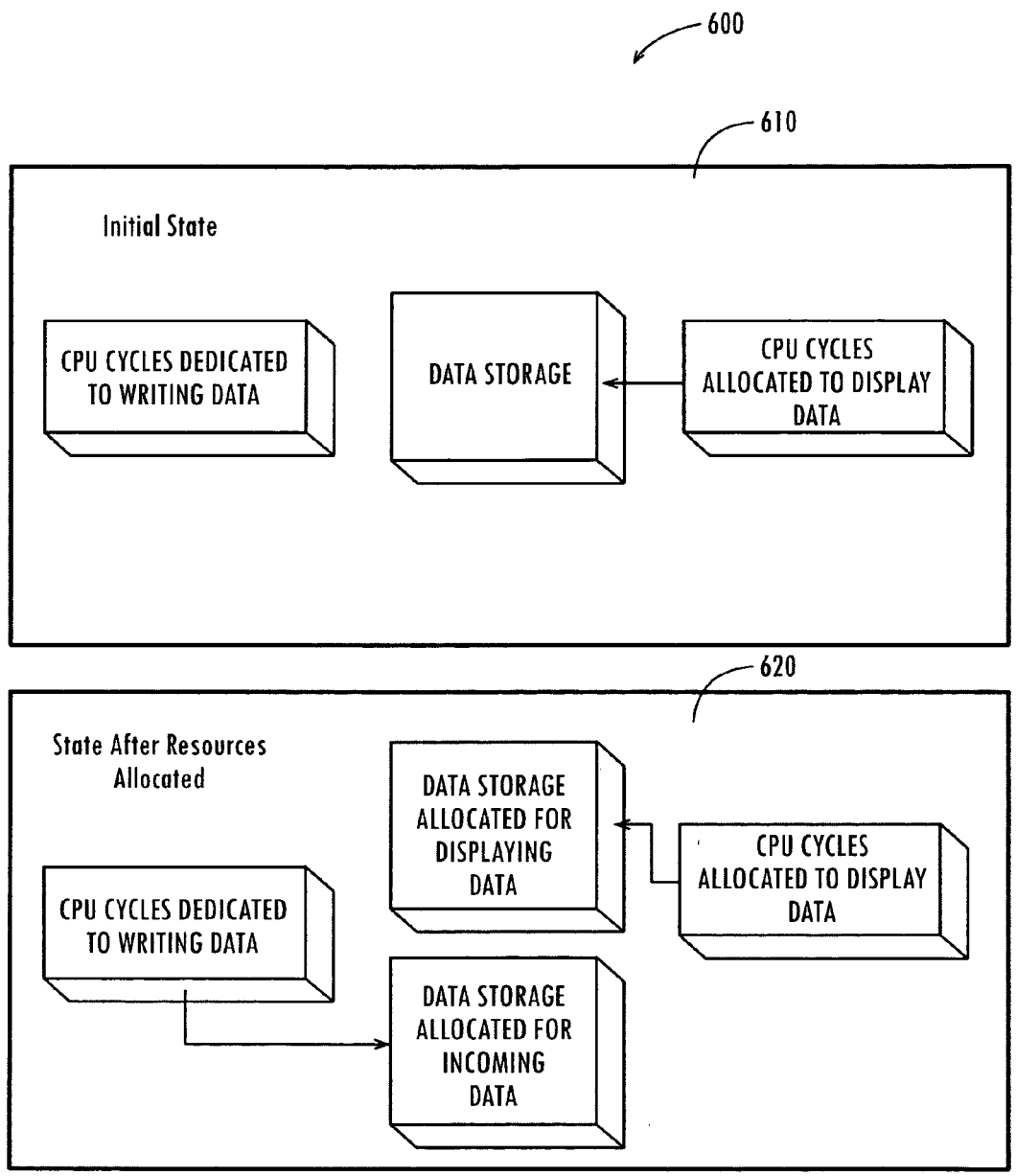
FIG. 6 illustrates an exemplary difference in states in a DSDD system after resources have been exclusively allocated.

FIG. 6 illustrates various resource allocation states, according to exemplary embodiments. In an initial allocation state 610, all data storage resources and CPU cycles are allocated to playing movies to customers. There is no conflict between resources in this state. According to an exemplary embodiment, a state that has no resource conflicts, such as state 610, will only move to another state that has no resource conflicts, such as state 620. In state 620, as the CPU cycles are dedicated to writing data, then the appropriate data storage is allocated for storing incoming data, whereas as the CPU cycles are allocated to display data, the appropriate data storage is allocated for displaying data. The system will only move to a new state 620 if each of the resources needed for a particular task, e.g., the storage resources and the CPU cycles, can be exclusively allocated to that task.

According to exemplary embodiments, a vertically integrated terrestrial distribution system provides for digital media storage and display. Distribution of video or audio content within a network may be controlled based upon network and resource availability and capability. An operator is enabled to select a set of digital media to distribute and also a set of data storage devices to which to distribute the media. The architecture provides good data distribution and access performance by dynamically allocating resources to the exclusive tasks of data distribution, data reading, or data writing.

It should be understood that the foregoing description and accompanying drawings are by example only. A variety of modifications are envisioned that do not depart from the scope and spirit of the invention.

What is claimed is:

1. A method for distributing video data from a transmitting server to a receiving server, the method comprising:
   receiving by the transmitting server a schedule from a schedule provider indicating a desired time for distributing the video data from the transmitting server to the receiving server, wherein the schedule comprises metadata for the video data and excludes the video data, the metadata corresponding to content type;
   proposing by a schedule director of the transmitting server, the proposing being at least partially based on at least a portion of the metadata, an input data path for the receiving server;
   determining, in response to the step of proposing, by a resource manager of the receiving server, whether resource dependencies exist within the receiving server;
   where the resource dependencies exist within the receiving server, enumerating, by the resource manager, one or more resource dependencies for each of a plurality of resource chains for the input data path;
   matching the plurality of resource chains with one or more existing resource reservations in the receiving server;
   determining a first resource chain from the plurality of resource chains with resources sufficient for the input data;
   reserving in the receiving server the one or more resources corresponding to the first resource chain; and
   receiving the video data at the receiving server from a data source using the first resource chain.

2. The method of claim 1, wherein the determining comprises determining a first resource chain from the plurality of resource chains with resources sufficient for the input data path using a cost minimization algorithm.

3. The method of claim 1, further comprising receiving at the transmitting server the video data from the data source over a first communications link.

4. The method of claim 1, wherein receiving comprises receiving by the transmitting server in real time a schedule indicating a desired time for distributing the video data from the transmitting server to the receiving server.

5. The method of claim 1, wherein each resource comprises at least one of communication bandwidth, storage capacity, or CPU cycles.

6. The method of claim 1, further comprising creating by the receiving server data that makes the video data usable to a user.

7. The method of claim 1, further comprising transmitting the video data from the transmitting server to the receiving server over a second communications link.

8. The method of claim 7, wherein the second communications link comprises the Internet.

9. The method of claim 8, further comprising transmitting the video data from the receiving server to a user over a third communications link.

10. The method of claim 9, wherein the first, second, and the third communications links are distinct.

11. A method for distributing video data from a transmitting server to a receiving server, the method comprising the steps of:

receiving at the transmitting server the video data from an external data source;

receiving by the transmitting server a schedule comprising metadata for the video data and excluding the video data from a schedule provider, the schedule indicating a desired time for distributing the video data from the transmitting server to the receiving server, the metadata corresponding to content type;

proposing by a schedule director of the transmitting server an input data path for the receiving server;

determining, in response to the step of proposing, by a resource manager of the receiving server, whether resource dependencies exist within the receiving server;

where the resource dependencies exist within the receiving server, enumerating, by the resource manager, one or more resource dependencies for each of a plurality of resource chains for the input data path;

matching the plurality of resource chains with resources sufficient for the input data path;

determining a first resource chain from the plurality of resource chains with resources sufficient for the input data path;

reserving in the receiving server the one or more resources corresponding to the first resource chain;

receiving the video data at the receiving server using the first resource chain;

creating by the receiving server data that makes the video data usable to a user; and transmitting the video data from the receiving server to the user over a communications link.

12. The method of claim 11, wherein the determining comprises determining a first resource chain from the plurality of resource chains with resources sufficient for the input data path using a cost minimization algorithm.

13. The method of claim 11, wherein receiving comprises receiving by the transmitting server in real time a schedule indicating a desired time for distributing the video data from the transmitting server to the receiving server.

14. The method of claim 13, wherein the transmitting server and the receiving server are connected by the Internet.

15. The method of claim 14, wherein the communications link comprises the internet.

16. The method of claim The method of claim 14, wherein the communications link comprises a coaxial cable.

17. The method of claim 14, wherein determining comprises determining a first resource chain from the plurality of resource chains with resources sufficient for the input data path using a cost minimization algorithm.

18. The method of claim 11, wherein each resource comprises at least one of communication bandwidth, storage capacity, or CPU cycles.

19. The method of claim 1, wherein the input data path comprises information for the resource manager to determine eligible points of entry for the video data into the receiving server.

20. The method of claim 19, wherein the input data path further comprises information corresponding to whether the eligible points of entry imply downstream resource utilization unknown to the to the schedule director.

* * * * *

UNITED STATES PATENT AND TRADEMARK OFFICE
CERTIFICATE OF CORRECTION

PATENT NO.        : 7,877,468 B2
APPLICATION NO.   : 10/821802
DATED             : January 25, 2011
INVENTOR(S)       : Sam Abadir et al.

Page 1 of 1

It is certified that error appears in the above-identified patent and that said Letters Patent is hereby corrected as shown below:

In the Specifications:
At Column 8, Line 44, the words "a the receiving DSDD server complex" should be changed to --the receiving DSDD server complex--.

In the Claims:
Column 16, Line 17, claim 16, the words "The method of claim The method of claim 14," should be changed to --The method of claim 14,--.

Column 16, Line 33, claim 20, the words "to the to the schedule director" should be changed to --to the schedule director--.

Signed and Sealed this
Tenth Day of May, 2011

David J. Kappos
*Director of the United States Patent and Trademark Office*